Dec. 8, 1964

E. W. PAXTON 3,160,692

APPARATUS FOR CONTROLLING THE FLOW OF MOLTEN
SILICATES THROUGH THROAT TYPE
CONTINUOUS MELTING FURNACES

Filed Aug. 1, 1960

INVENTOR.
Elisha W. Paxton
BY
Schmieding and Fultz
ATTORNEYS

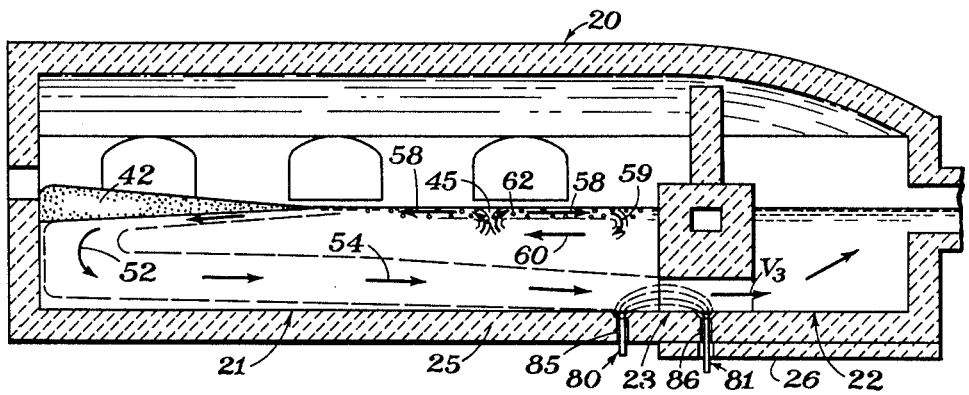
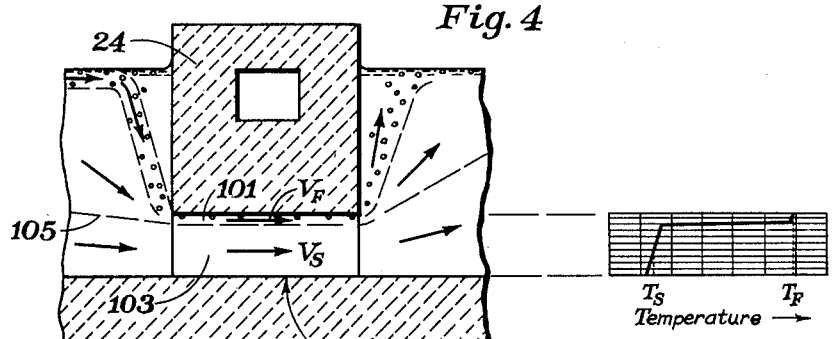
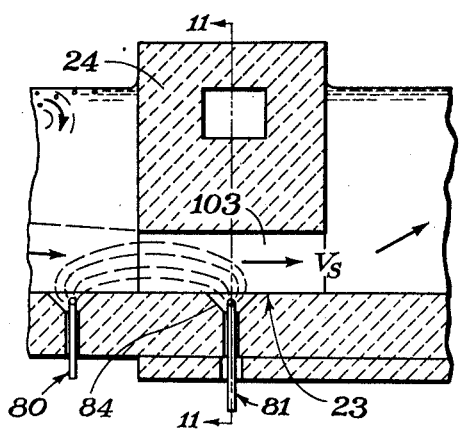
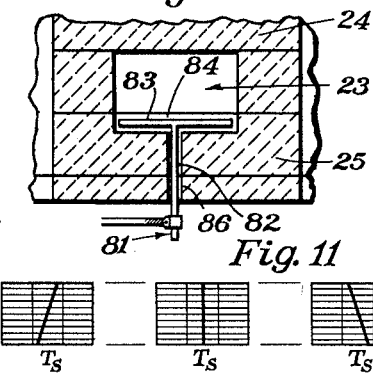

Dec. 8, 1964     E. W. PAXTON     3,160,692
APPARATUS FOR CONTROLLING THE FLOW OF MOLTEN
SILICATES THROUGH THROAT TYPE
CONTINUOUS MELTING FURNACES
Filed Aug. 1, 1960     4 Sheets-Sheet 3

INVENTOR.
Elisha W. Paxton
BY
Schmieding and Fultz
ATTORNEYS

Dec. 8, 1964 E. W. PAXTON 3,160,692
APPARATUS FOR CONTROLLING THE FLOW OF MOLTEN
SILICATES THROUGH THROAT TYPE
CONTINUOUS MELTING FURNACES
Filed Aug. 1, 1960 4 Sheets-Sheet 4

INVENTOR.
ELISHA W. PAXTON
BY
Schmieding and Fultz
ATTORNEYS

United States Patent Office 3,160,692
Patented Dec. 8, 1964

3,160,692
APPARATUS FOR CONTROLLING THE FLOW OF MOLTEN SILICATES THROUGH THROAT TYPE CONTINUOUS MELTING FURNACES
Elisha W. Paxton, 200 Montrose Way, Columbus, Ohio, assignor of ten percent to Warren H. F. Schmieding, San Diego, Calif.
Filed Aug. 1, 1960, Ser. No. 46,839
10 Claims. (Cl. 13—6)

The present invention relates generally to the production of silicates, and more particularly to a method and apparatus wherein energy is applied to flowing molten silicates for controlling the flow behavior of the system in a novel and efficient manner, and for effecting a disturbance of the hydraulic characteristic of the system whereby increased production rates of high quality material are achieved.

This application is a continuation-in-part of co-pending application Serial Number 607,194, filed August 30, 1956, which is a continuation-in-part of Serial Number 498,258, filed March 31, 1955, now abandoned, which is in turn a continuation-in-part of Serial Number 425,262, filed April 23, 1954, now abandoned.

In producing molten glass, or the like, it is common practice to use continuous melting furnaces which are formed with two or more basins or channels for confining the molten materials. In the operation of such furnaces, raw materials, such as silica and alkaline carbonates, are continuously introduced at the upstream end of the furnace, and molten silicates are continuously withdrawn from the downstream end of the furnace. The molten silicates are thereby continuously produced and withdrawn to form useful products such as bottles.

It is also common practice to construct a furnace basin of the above mentioned type, with an upstream compartment, termed a melting basin, which is separated by a double wall called a "bridge wall," from a downstream compartment commonly referred to as a working basin. A passage or so-called "throat" is provided through the bridge wall to permit the flow of molten silicates between the basins, with the lintel, or top wall, of such throat being located below the normal surface level of the molten silicates. Heat is applied to the melting basin to melt the mixture of solid raw materials known as the "batch." Incident to the melting of the raw materials, bubbles and so-called "seed" are formed, the latter being bubbles of the smaller size; thus the seed are the last to rise and burst through the surface-tensioned topmost stratum and are therefore the last bubbles to be eliminated from the melt. The presence of seed in furnished products, formed from the molten silicates, lowers the quality of such products. Since the seed locate themselves in the surface strata of the molten silicates, the bridge wall, through which the above mentioned subsurface passage is formed, is designed, and tends, to restrict the seed to the melting basin on the upstream side of the bridge wall between the basins. Hence the working basin should contain only molten silicates relatively free of the objectionable seed. This intended result, however, is only realized below certain critical flow rates as will be explained herein.

It is economically advantageous to operate any such continuous melting furnace at as great a yield rate as possible, which is ordinarily done by raising the temperature of fuel-fired furnaces to the limit of the economic life of the refractory structure, even though fuel usage and costs are an hyperbolic function of temperature attained. Such production rates are generally expressed in tons per day of molten silicates produced. When the yield of any such conventional melting furnace is increased beyond a certain critical rate, however, seed will relatively suddenly appear in the working basin, and hence in the finished silicates which are being withdrawn for product manufacture, and will as suddenly cease to appear therein when the yield is subsequently reduced below said critical rate, by even a very small amount, relative to the total production rate. This could not occur were the seed distributed in depth in the bath. These phenomena constitute definite proof that the seedbearing top strata in the melting basin, even though much hotter and therefore of lower density than the lower strata, are, in some manner to be explained later, induced to plunge downwardly far below their normal level and to pass through the throat to the working basin.

Although a certain amount of seed is tolerable, depending upon the quality requirements of the product being fabricated, there is maximum acceptance concentration of seed which concentration is expressed in the number of bubbles per unit weight present in any given product. For example, forty small bubbles or seed per ounce is an acceptable average in the bottle industry. Moreover, the amount of seed progressively will increase with further increases in the rate of production beyond the above-mentioned critical rate. It is therefore obvious that the maximum production rate at which such a continuous melting furnace may be operated, must be limited by the maximum acceptable concentration of seed entering the working basin and appearing in the product.

It is common practice in the art to utilize fuel-fired melting furnaces wherein flames are continuously omitted from firing ports and directed across the surface of a "batch blanket" of raw materials as well as across the surface of the molten silicates flowing downstream from the batch blanket.

In other instances, particularly at locations where electric power is economically available, electric resistance heating has been utilized for melting in all-electric furnaces instead of the above-mentioned fuel firing method; the heat being generated within the molten bath, due to the "Joule effect" resulting from passing alternating electric current through said molten bath.

In still other instances, so-called "electric booster melting" has been applied to fuel-fired melting furnaces in a similar manner to supply additional heat within the molten bath.

Each of the above mentioned conventional melting furnace types is subjected to the previously-described maximum production limitation at which a maximum acceptable concentration of seed will occur in the working basin at a certain definite rate of flow for the particular system and material.

I have discovered that the relatively sudden occurrence of seed in the working basin of a melting furnace, which occurs at a definite critical rate of production, is not and cannot be due to any sudden increase in the rate of seed formation because the approach to the critical production rate must be at relatively steady and gradual rates. In fact, the sudden occurrence of seed in the downstream working basin is in no way explainable by thermal phenomena alone. Such relatively sudden appearances of seed in the downstream melting basin can only be explained by hydraulic flow phenomena occurring in the region of the throat passage through the bridge wall separating the melting basin from the working basin. According to these phenomena, at flow rates less than some critical flow rate, many seeds are present in the hot surface strata of the melting basin yet practically no seeds are present in the working basin. When said critical flow rate is reached, according to hydraulic phenomena set forth in detail later herein, I have discovered that a new and anomalous flow stratum is created, through the throat, consisting of the hot surface strata including the seed carried therein. Hence, the maximum production rates for present melting furnaces are not limited by the maximum volume of molten silicates which could flow through the throat opening in the bridge wall, but rather to some rate of flow at which is only slightly greater than the critical rate of flow at which seedbearing surface strata actually plunge down through the throat passage abruptly to create a new flow stratum through such passage, and by which seed then continuously are carried to the working basin.

According to the present invention, I have developed a process which efficiently eliminates the occurrence of the above-mentioned seedbearing flow stratum through the throat passage at the higher production rates, which rates were heretofore above the critical and were productive only of commercially unacceptable material. I achieve this novel and beneficial advantage mainly by controlling the flow behavior of the system, by making it possible to greatly accelerate flow rates, through the throat passage, of non-seedy lower strata by producing and concentrating a novel and profound thermal effect on the temperature, viscosity and consequent rates of flow of such non-seedy lower strata.

The above described primary advantages can be achieved with this invention by applying a relatively small amount of electrical energy to the flowing silicates at the aforementioned throat. My inventive process, however, should in no way be confused with conventional all-electric melting techniques, nor should it be confused with conventional methods of electric booster melting. My new process relates to such conventional methods only to the extent that electrical energy is utilized as one aspect thereof.

It is an object of the present invention to provide a method and apparatus for continuously producing molten silicates wherein the specific application of a relatively small amount of electrical energy will greatly increase the rate of production.

It is another object of the present invention to provide a method and apparatus which produces large yields of molten silicates for any given amount of fuel energy expended.

It is a further object of the present invention to provide a method and apparatus which will continuously produce molten silicates at a relatively high rate for the size of the melting furnace utilized.

It is another object of the present invention to provide a method and apparatus for producing molten silicates, in continuous flow production, of a higher quality of more homogeneous composition than has heretofore been realized by continuous flow production and techniques.

It is another object of the present invention to provide a method and apparatus which will increase the useful life of melting furnaces used in the production of molten silicates. In operating a melting furnace, the lintel, or upper boundary of the passage between the melting and working basins, has traditionally been a source of structural failure since the lintel has been subjected to the destructive action of high-temperature flowing silicates, particularly when the furnace is operated at high rates of production. The present invention increases furnace life and avoids shut-downs for repair, by protecting the lintel and other parts of the furnace structure from the destructive action of excessively hot molten silicates.

It is another object of the present invention to provide a method and apparatus which, in the continuous high-rate production of molten silicates, eliminates the presence of undesirable seed or bubbles, at flow rates which heretofore have caused excessive seed to be present in the molten silicates in the working basin. Moreover, in common instances where product standards do not require the virtual elimination of seed, the present invention provides higher production rates for any given seed concentration which can be tolerated.

It is another object of the present invention to provide a method and apparatus for continuously producing molten silicates more nearly approaching homogeneity, both as to composition and age-under-heat. The physical characteristics of any specific portion of molten silicates are a function of the age-under-heat of the material. The present invention produces a more nearly homogeneous product by minimizing the age-under-heat differential of various flow strata of silicates passing through a melting furnace, and thus greatly improves the degree of their uniform reaction to the subsequent necessary product-forming operations.

It is still another object of the present invention to provide a method and apparatus of the type described, which in the production of molten silicates, eliminates the risk of frozen throat passages when a melting furnace is idle during a shut-down. Such frozen throat conditions are traditionally avoided by continuing to withdraw molten material from the furnace during shut-down, thus causing some flow through the throat, to keep it active and hot. With the present invention, however, the molten silicates which were formerly withdrawn during a shut-down, solely for the purpose of keeping the throat active and open, can now be saved instead of being remelted as "cullet."

It is another object of the present invention to provide a method and apparatus of the type described wherein electrodes are utilized for applying electrical energy to molten silicates, but wherein the electrode surfaces are subjected to relatively low current concentrations which result in longer electrode life. This advantage is due to the comparatively low power requirement for achieving the high rates of production of the present invention.

It is another object of the present invention to provide a method and apparatus for continuously producing molten silicates wherein electrodes are utilized to supply electrical energy. Due to the particular method of the present invention, however, the space between electrodes is relatively so small that electrical and other calculations, for a given installation, are greatly simplified. Moreover, with the comparatively low voltage that is required, the flexibility of the electrical equipment is greatly increased so that such equipment is compatible with the various operational requirements which occur with changes in glass composition or color. The relatively low voltages required also eliminate all possibility of sensible electric shock being experienced by operating personnel.

It is still another object of the present invention to provide a novel electrode arrangement for melting furnaces whereby electrical power can be concentrated on lower strata than has heretofore been possible, and whereby the electrodes can be easily and effectively protected from oxidation, during heating of the furnace.

Further objects and advantages of the present invention will be apparent from the following description, reference being had to the accompanying drawings wherein preferred forms of embodiments of the invention are clearly shown.

In the drawings:

FIGURE 4 is a view of a melting furnace of the type shown in the preceding figures and showing the present invention adapted to such melting furnace;

Figure 1:
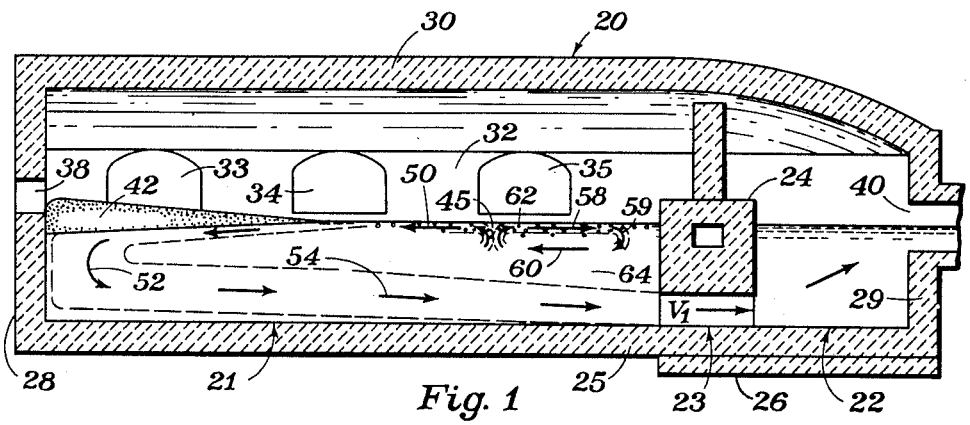
FIGURE 1 is a side sectional view of a glass-melting furnace, typical of the furnaces employed in the manufacture of bottles, jars, pressed glassware, and the like, with such furnace being shown in continuous-flow operation. The section is taken along a vertical plane lying along the longitudinal centerline of the melting furnace.
Figure 2:
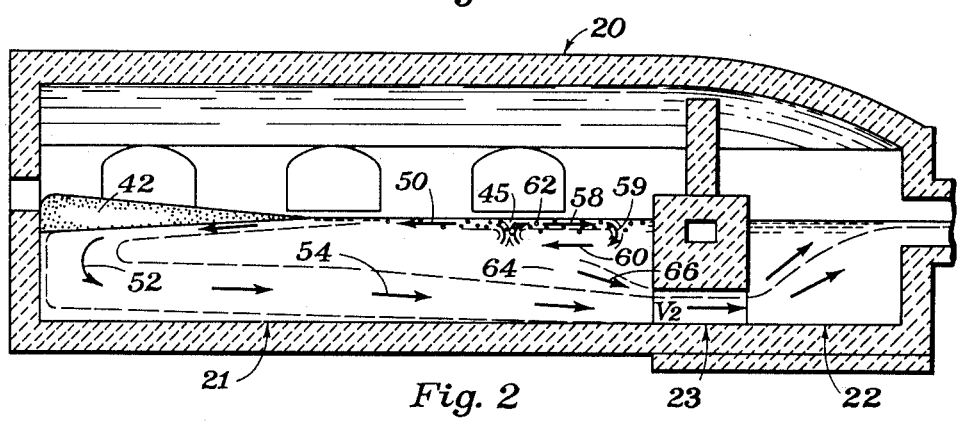
FIGURE 2 is a view corresponding to FIGURE 1, but showing the melting furnace operating at a higher rate of production, with increased flow of molten silicates, as compared to the flow condition shown in FIGURE 1.
Figure 3:
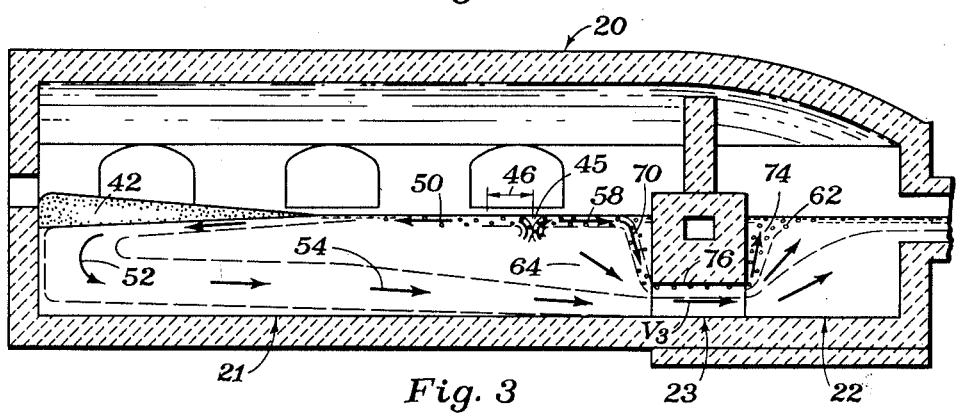
FIGURE 3 is a view of the melting furnace of the preceding figures showing such melting furnace operating at a still greater rate of production, and with a still faster flow of the molten silicates, as compared to the flow condition shown in FIGURE 2.
Figure 12:
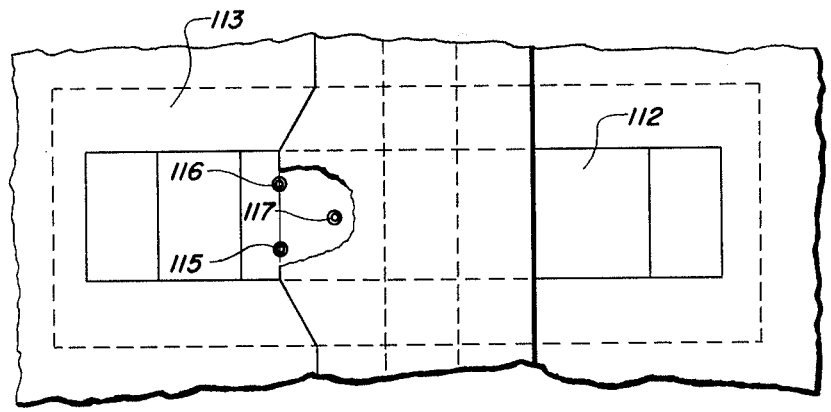
Figure 13:
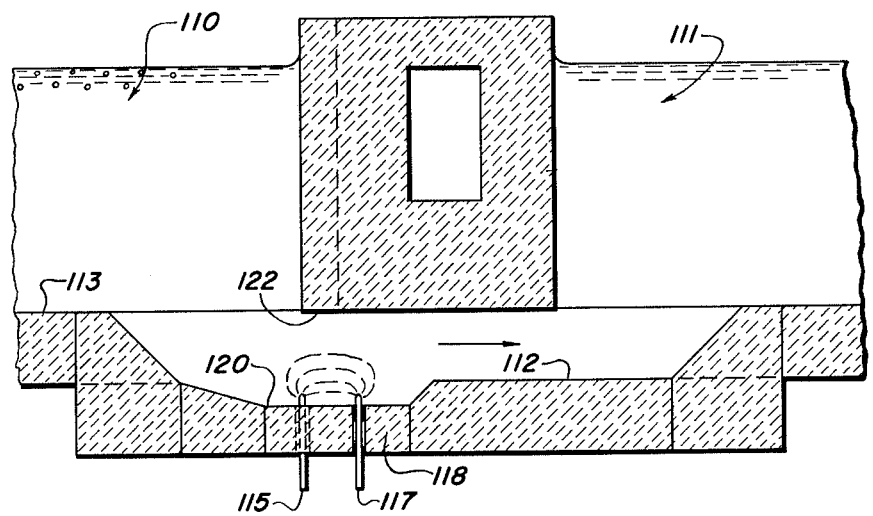
Figure 15:
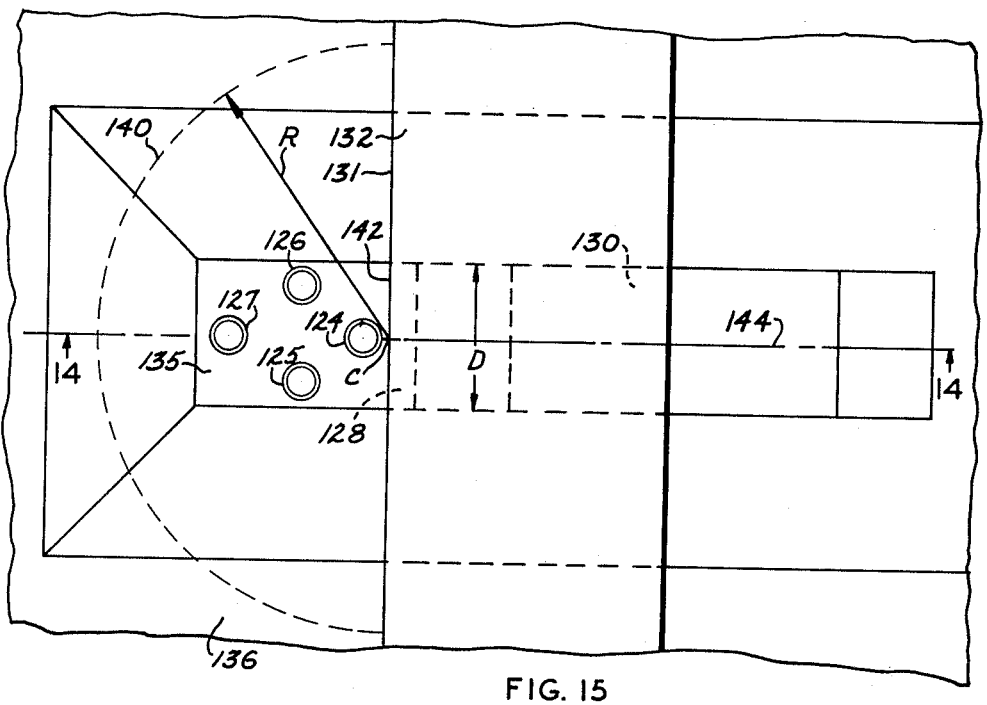
Figure 14:
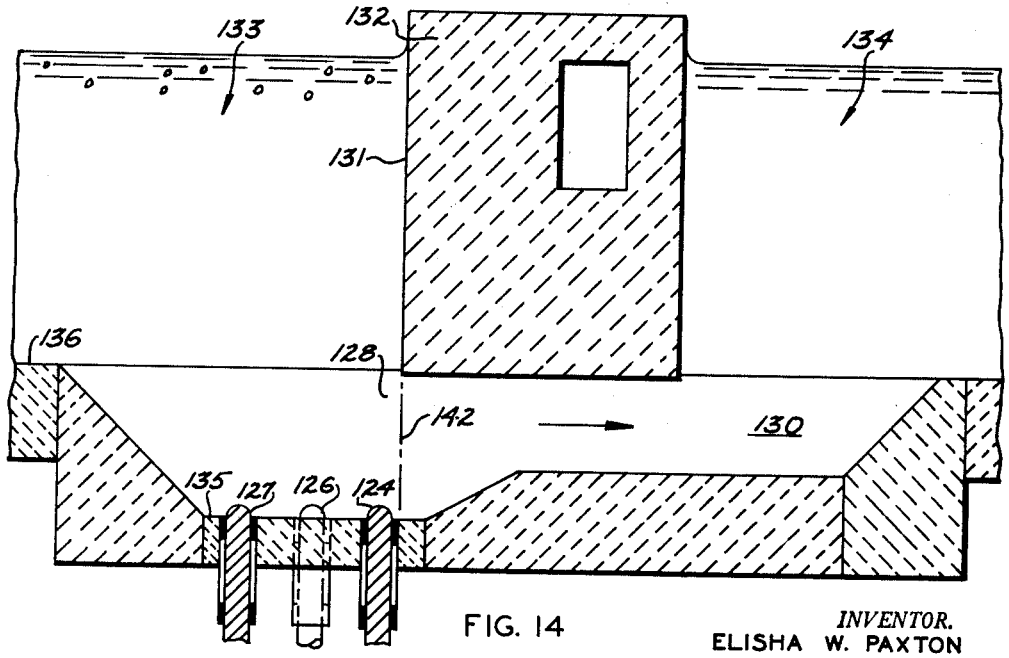

FIGURE 5 is a partial side sectional view of the melting furnace shown in FIGURES 1 through 3. This view diagrammatically shows the flow strata for a typical flow condition, at the throat through the bridge wall. The section is taken along a vertical plane passing through the longitudinal centerline of the melting furnace;

FIGURE 6 is a graph illustrating the temperature gradient through the strata of flow in the throat illustrated in FIGURE 5;

FIGURE 7 is a partial side sectional view of the melting furnace of FIGURE 4, to which the present invention is applied. This figure diagrammatically illustrates the flow condition through the throat of the furnace. The section is taken along a vertical plane passing through the longitudinal centerline of the furnace;

FIGURE 8 is a graph showing the temperature gradient through the flow in the throat illustrated in FIGURE 7;

FIGURE 9 is a graph corresponding to FIGURE 8, and showing a different temperature gradient for a flow condition through the throat illustrated in FIGURE 7;

FIGURE 10 is a graph, corresponding to FIGURE 8, and showing still another temperature gradient for a flow condition through the throat illustrated in FIGURE 7;

FIGURE 11 is a sectional view of the melting furnace of FIGURES 4 and 7 with the section being taken along a vertical plane extending transversely to the direction of flow through the furnace;

FIGURE 12 is a partial plan view of a furnace showing the present invention applied thereto;

FIGURE 13 is a partial sectional elevation taken along the center-line of FIGURE 12;

FIGURE 14 is a partial sectional elevation of a furnace showing the present invention applied thereto, the section being taken along the line 14—14 of FIGURE 15; and FIGURE 15 is a partial plan view of the furnace of FIGURE 14.

Referring to the drawings, FIGURE 1 shows a three-port cross-fired regenerative furnace of the Siemens type, with such furnace being indicated generally at 20. In general, this type of furnace is formed with two basins, connected by submerged throats or passages.

With reference to FIGURE 1, furnace 20 includes a melting basin indicated generally at 21, and a working basin indicated generally at 22. A throat or passage, indicated generally at 23, is formed by a bridge wall 24 and the bottom 25 of the furnace. The furnace structure also includes an upstream end wall 28, a downstream end wall 29 and roof arch 30. A side wall 32 is provided with three firing ports indicated at 33, 34, and 35, respectively. An intake opening 38, through the upstream end wall 28, permits the introduction of raw materials into the melting basin 21. An exit port 40, is formed through the downstream end wall 29 and permits the withdrawal of molten silicates from the working basin 22.

Upon introduction of raw materials through the intake opening 38, such materials form what is commonly termed a "batch blanket" 42 which lies on the surface of the molten silicates at the upstream end of the melting basin, as shown in FIGURE 1. The batch blanket, being exposed to fuel firing through the firing ports, becomes progressively hotter in a downstream direction.

Proceeding downstream from the intake opening 38, the materials are continuously being chemically transformed from raw materials into molten silicates, with a portion of the total applied heat being expended in producing the chemical transformation. Hence, proceeding in a downstream direction, such portion of the total available heat which is expended for chemical transformation, becomes progressively less, and the remaining portion of the total heat which is available to raise the temperature of the molten silicates becomes progressively greater, up to a location of the hottest spot, or "spring" 45, first recognized and so named in the treaties of Germany's Gelhoff.

*The Fast Rearward Surface Flow From the Spring and the Slow Downstream Flow of the Lower Strata*

As stated above, and as seen in FIGURE 1, a spring or fountain effect occurs at 45 which is the location of the highest temperature normally occurring along the centerline of the melting basin. The spring engenders a thin, relatively fast moving stratum of molten silicates flowing at the surface in the melting basin in all directions from the spring or source. The location and direction of the rearward-moving part of this stratum is indicated generally by the arrow 50. It will be noted that the stratum 50 is a thermally-induced current which actually pushes the batch blanket 42 rearwardly, as is well known in the art. Were this rearward flow not present, the batch blanket would tend to cover the entire surface of the batch in the melting basin 21. As the flow of stratum 50 progresses, it passes under the batch blanket 42 and becomes cooler, since it not only loses heat by radiation thereto but is then being shaded thereby from the heat radiated from the flames. Consequently, the viscosity and density of the stratum 50 increases, and as it becomes progressively more viscous, it moves with progressively slower velocity, finally sinking adjacent to the upstream wall 28 as indicated by the arrow 52. The moving stratum 50 then joins the comparatively oozing forward progress of the lowermost strata indicated by the arrow 54. With reference to FIGURE 1, it will be understood that the lowermost strata 54 are formed of relatively cool, viscous, slow-moving material and the velocity at which the lower strata 54 progresses is controlled by the rate at which such strata can progress through the throat 23.

*The Fast Downstream Surface Flow From the Spring and the Hydraulic Effect of Increasing Production Rates*

Referring again to FIGURE 1, it will be noted that some of the molten material welling up at the spring 45 will move downstream from the spring in a surface flow indicated by the arrow 58. With the furnace operating at a moderate production rate, as illustrated in FIGURE 1, the downstream-progressing surface stratum 58 must curve downwardly as it encounters the bridge wall as shown by arrow 59 and then must progress toward the spring in the manner indicated by the arrow 60. It should be noted that this flow must reach zero horizontal velocity due to the presence of the bridge wall, and since it remains very hot there is no force available to cause it to sink into the cooler denser lower strata. Hence it is seen that the molten silicates follow the closed circulation course indicated by the arrows 58, 59, and 60, and must normally do so. As explained previously herein, incident to the chemical transformation of raw materials into molten silicates, bubbles or seed are continually being evolved. Such seed tend to rise to the surface and burst, but some, especially the smallest, are carried along in the surface stratum flowing from the spring 45 before they can burst free. Seed 62 are shown, for example, in the figures in flowing surface stratum 58.

Referring next to FIGURE 2, the furnace of FIGURE 1 is again illustrated, but such furnace is now operating at an increased mean velocity of flow indicated at $V_2$ as compared to the slower mean velocity $V_1$ of the flow of FIGURE 1. Under the moderate flow condition of FIGURE 1, all of the molten silicate passing through the throat at the velocity $V_1$ is composed of viscous, slow-moving molten silicates from the lower strata 54. None of the relatively hotter material of lesser density from the vicinity of 64 will enter the passage 23 since such hotter, lighter material in the vicinity of 64 tends to rise and remain there above the relatively dense material in the strata 54.

When the mean flow velocity through the passage 23 is increased, due to increased withdrawal for production, from the mean flow rate $V_1$ in FIGURE 1, to the mean flow rate $V_2$ in FIGURE 2, the relatively hotter glass of lesser density, in the vicinity of 64, will begin to plunge downwardly and enter the throat passage 23, as indicated by the arrow 66. It should be noted that the particular mean flow velocity $V_2$, at which such strata of hotter material from the region of 64 begins this very anomalous behavior, will depend on such factors as the design characteristics of the particular furnace; the type of material being produced; the operational temperature; the temperature gradient and other less potent factors.

With a further increase in furnace production, to a point where the mean flow through the throat must reach a velocity $V_3$ in order to satisfy it, as indicated in FIGURE 3, the hot flow 58 will plunge even more precipitately downwardly along the path indicated by the arrow 70. Such downward flow from the ultimate surface region, along the path of arrow 70, is but the culmination of increase in the trend described in the preceding paragraph. With the commencement of the downward flow from the surface, seed 62 will begin to plunge downwardly with the moving stratum 70 and pass through the throat 23 and into the working basin 22.

It is significant to note that the seed 62 normally exist only in the top-most stratum of the bath in the melting basin. That seed do not exist at depth is evidenced by the fact that a comparatively slight reduction of production, and hence flow rate, will promptly stop the appearance of seed in the working basin 22. Such sudden appearance and disappearance of seed in the working basin, at some critical flow condition, obviously could not occur if all the glass in the melting basin contained seed. Top-stratum glass, such as is shown at 58, must therefore, despite its higher temperature and lower density, plunge down and enter the passage 23, and in so doing, create the anomalous flow 70 which passes through strata of progressively cooler and denser glass. The occurrence of such plunging effect is further evidenced by measuring the temperature of the flow 74 rising from throat exit as seen in FIGURE 3. That is, the higher the production rate, the more nearly does the temperature of the glass rising from the passage exit at 74 approach that of the stratum 58, rather than the much lower temperatures existing in depth, as at 52. Further evidence of the plunging of upper stratum glass along the flow path 70 is furnished by the disparity of the wear of the various structural portions of passage 23. Inasmuch as the lintel 76, of the throat 23, is destroyed first in instances where a furnace has been continuously operated with the occurrence of seed in the working basin 22, such prior destruction of the lintel can only be explained by the exposure thereof to destructive action from the downward-plunging, excessively hot surface material to which said lintel has been exposed. At the same time, the sides and bottom of the passage 23 are exposed only to relatively cool material, which is evidenced by their respective patterns of wear.

To produce the character of flow above described, that is, the plunging of hot surface material from the stratum 58, down through the throat, and into the working basin, a definite expenditure of energy is required, since relatively low-density surface material is moved downwardly through lower strata of progressively cooler and denser material. In addition, to produce the character of flow presently being described, it is necessary that there be large differences, with increasing depth, in the resistance to flow of the various strata. The above mentioned energy, which produces the plunging effect described, must, according to the fundamental laws of hydraulics, be derived from the static hydraulic head created by the difference in surface levels of the molten silicates at the intake and exit ports of the furnace. Since the total available hydraulic head increases with an increase in production rate of the furnace, the total energy at any point along the flow must also increase according to the theorem of Bernoulli. Accordingly, when the head is increased, the velocity of flow of the lower viscous strata, along the path 54 and through the throat, will be increased. As such lower strata is heavy and viscous, its total resistance to increases in velocity becomes progressively greater, with increases in furnace production, until some point is reached at which it requires less energy to move some of the required total volume from intermediate strata in the vicinity of 64 and through the throat, than the energy required to move the same volume of material by increasing the velocity of the lower flow 54, alone. Such condition, wherein intermediate strata glass is moved downwardly from 64, is illustrated in FIGURE 2. As the total resistance to increased velocity of the lower flow 54 becomes still greater, when the velocity of such flow is increased from $V_2$ of FIGURE 2 and $V_3$ of FIGURE 3, surface glass will be caused to move downwardly along the path 70 as this occurs, together with some glass from region 64, as shown in FIGURE 3, since less energy is required to supply the throat with surface material 58 than is required to increase the mean velocity of all of the lower strata which are already moving at rates which are maxima for the existing hydraulic head and their higher average viscosity.

It will therefore be seen that as the production rate of a given melting furnace is increased, beyond a certain critical point, the compartively viscous molten silicates, lying below the level of the throat lintel, can no longer satisfy the increased flow demand by advancing horizontal to and through the throat. At the same time, additional energy is available, due to the increase in hydraulic head which occurs with the increase in production withdrawal. Such additional energy is expended in causing the flow of molten silicates, from zones where such silicates have progressively and relatively less resistance to flow, to and through the throat. Hence material is drawn from progressively higher strata as the additional energy available becomes great enough to overcome the tendency for the less-dense upper strata to remain at the upper levels. It is therefore seen that as the production rate is progressively increased above the critical point, the flow through the throat includes material from progressively higher strata which, though less dense, is freer-flowing, due to lower viscosity. Still further production-rate increases further aggravate this condition until the upward-reaching of the flow toward the throat entrance arrives at the ultimate, i.e., from the topmost stratum in the melting basin which carries the seed previously mentioned.

When a melting furnace is operated at such high production rates, the phenomenon just described begins to affect the otherwise fairly quiescent surface condition and actually causes seedy top-stratum material to pass downwardly through the throat. With the increase in such surface flow, at 58, in FIGURE 3, the springs 45 is displaced downstream as shown at 56, responsive to the sheer force of flow. At the same time, the surface currents moving rearwardly from the spring, as indicated at 50, are weakened, permitting the batch to move farther forward. This is an undesirable effect, inasmuch as it occurs at the very time when the thermal requirements for melting have been raised and additional batch material is being fed into the melting basin to compensate for the increased withdrawal from the working basin.

Melting flow, and plaining rates, "plaining" being common terminology in the art for the elimination of bubbles and seed, are all functions of time, and of the physical dimensions involved. The net effect of the horizontal forward component of flow produced by the displacement caused by the plunging hot surface glass at 70 is to accelerate the forward surface flow in the fixed dimensions of the melting basin surface and thus to reduce the time afforded for the rise, bursting and escape of the bubbles and seed. Moreover, the advance of the batch blanket, as previously described, still further reduces the distance and thus the time available for this purpose. Bubbles and seed in excessive quantities thus remain entrained, to pass downwardly with the flow 70.

These rapidly converging series of limiting factors quickly put an end to further attempts to increase production after a substantial horizontal component of seed-bearing flow has been developed at the surface of the melting basin.

In view of the preceding description of the hydraulic performance of the surface flow, downstream from the spring, and of the flow along the bottom of the furnace, it will be readily apparent that the production rate of any given furnace can be increased to the point at which the major portion of tonnage moving through the throat is supplied by the thin, fast-moving stream of surface material, with such hot material passing through the upper portion of the throat 23 in contact with the lintel 76.

It will now also be understood from FIGURE 3 that the hotter and thinner the stream 70, the greater will be its velocity, and the less, relative thereto, will be the movement of the lower strata 54 into and through the passage. Such is true because the volumetric sum of these two flow movements must equal the total volumetric flow through the passage 23 to satisfy the Law of Continuity.

*The Effects of the Present Invention on the Characteristics of Flow Through the Submerged Throat Passage of a Melting Furnace*

Referring to FIGURE 4, the furnace 20 of the preceding figure is again illustrated. According to the present invention, however, a pair of spaced electrodes 80 and 81 are extended upwardly through holes 85 and 86 in furnace bottom 25. The electrodes are connected to a source of alternating electric current not shown. Since the molten silicates possess the property of becoming electrically conductive as a resistor of the so-called second class, the molten silicates serve as a current-carrying medium between the electrodes, serves to apply heat, at the throat, to the lower viscous strata 54 as seen in FIGURE 4.

I have discovered that only a relatively small amount of electric power, supplied to the electrodes 80 and 81, is required to materially decrease the viscosity, and hence the resistance to flow, of the lower strata 54. This permits the lower strata 54 to move at a greater velocity, under the existing hydraulic head, than would be possible if the heating effect of the electrodes were not applied according to the present invention. Moreover, the furnace, with the present invention applied thereto, can be operated at a greater rate of production, without excessive seed passage, since the critical flow rate, at which seed-bearing upper strata begin to pass through the throat passage 23, will assume some higher value under the present invention. This will be readily understood upon considering that the passage of seed through the throat and into the working basin is the production-rate-limiting factor, and by remembering that when a furnace is operating according to the present invention, a greater proportion of the total material passing through the throat is drawn from the relatively seedless lower strata 54. Hence a lesser proportion of the total material would be drawn from the seedy upper stratum 58, or perhaps none of such seedy material would be drawn, depending on the specification of the product, and whether or not the operator would desire to operate the furnace at maximum rate.

A comparison will next be made of the flow characteristics of FIGURES 3 and 4 in order diagrammatically to illustrate the manner in which the present invention increases the production rate at which the flow through the throat passage becomes critical.

Assume that the production rate of the furnace of FIGURE 1 is indentical with the production rate of the furnace of FIGURE 4. As stated previously, both furnaces are of indentical size and design with the exception of the application of the present invention to the furnace of FIGURE 4. The same volumetric rate of material passage must exit through each throat, and since the areas of the throat passages are identical, the mean velocity through each throat will be equal as designated by $V_3$ in each figure.

According to the hydraulic phenomena previously set forth, a velocity $V_3$ through the throat of the furnace of FIGURE 3 produces a flow condition above the critical point, whereby the seedy surface stratum is caused to plunge downwardly and pass through the throat.

In contrast, however, the velocity $V_3$ is tolerable in the furnace of FIGURE 4 without causing the anomalous plunging flow which occurs above the critical point, and without the passage of seed to the working basin. This advantageous flow condition is achieved with the furnace of FIGURE 4 since the present invention increases the mobility of the viscous lower strata 54 and disturbs the hydraulic characteristic of the flow whereby such lower strata supplies the total volume of material passing through the passage. Moreover, the production rate of FIGURE 4 is identical to the production rate of FIGURE 3.

To carry the illustration further, it will be readily realized that the production rate of the furnace of FIGURE 4 can be increased above the condition shown until a critical rate for operation with the invention is reached, or above such critical rate, depending on the concentration of seed which can be tolerated.

In summary, the present invention can be selectively utilized to eliminate seed occurring at a given production rate, as was explained in the comparison of FIGURES 3 and 4, or the present invention can be utilized to increase the maximum commercially-acceptable production rate.

The significant fact that only a small amount of electrical energy need be applied at the electrodes 80 and 81, in FIGURE 4, can best be understood by considering that an increase in the temperature of the lower flow 54 at the electrodes, in the magnitude of 50° F. may, for example, be accompanied by a viscosity-change factor of 1.3 for the 50° temperature change. That is, the viscosity at the throat 23, of the viscous lower strata 54 will be decreased by about 23 percent with a rise in temperature of only 50° F.

In view of the foregoing flow analysis, it will, at this point, be understood that the main advantages of the present invention are achieved by increasing the mobility of the lower viscous strata 54 and by disturbing the hydraulic characteristic of the flow at the throat 23. Disturbing these anomalous physical phenomena is in no way analogous to increasing the rate of melting. Hence the present novel and economical modus operandi should in no way be confused with the conventional technique of applying relatively large quantities of electrical energy for the avowed and sole purpose of increasing the rate of melting of the raw materials. Such electrical application in conventional furnaces is effected only with the expenditure of relatively great amounts of electrical energy as compared with the present invention. Any increase in lower-strata velocity thus achieved, is only incidentally and inefficiently accomplished at great wastes of power. Such wastes of power occur due to heating of the whole bath in depth according to prior electrode arrangements, and consequently to the increased thermal loss from the entire melting basin. Moreover, in applying electric booster melting, what has heretofore been considered a small amount of electric power applied to a fuel-fired furnace produces a relatively large production-rate increase, as compared with the production rate increases produced, for each increment of power expended at relatively high rates of power input. Hence it is seen that not only are the conventional techniques inefficient at low rates of booster power application as compared to the present invention, but, in addition, such conventional techniques obey the law of diminishing returns and become progressively more inefficient as the electric booster power is increased. For example, if the amount of power being supplied by conventional booster meeting were to be increased indefinitely, it will be understood that a point would be reached at which the operation would become the equivalent of all-electric melting, at which point the electric power would be the equivalent of that required both for melting and for supplying the total thermal losses from the furnace. It should be noted that in the foregoing example the rates of fuel input would have had to be progressively reduced to zero in order to prevent over-heating of the furnace.

With reference to FIGURES 5 and 7, a simple analysis using a basic hydraulic formula is next set forth to illustrate why the application of a relatively small amount of electrical power to the lower viscous strata of silicates flowing through the throat, will have a profound effect in increasing the productive capacity of any given furnace, and why the application of such relatively small amounts of electric energy serves to eliminate the passage of seed through the throat and into the working basin of the furnace.

FIGURES 5 and 7 show identical melting furnace throats 23, with the structure of the present invention being applied only to the latter.

In FIGURE 5, the flow condition through the throat is above the critical point as illustrated, such that hot surface material is continuously plunging down to form an upper stratum 101. At the same time, relatively cool and viscous bottom material is progressing through the throat to form a lower stratum 103. The sum of the volumetric flow of the upper stratum 101 and the volumetric flow of the lower stratum 103 must be equal to the total volumetric flow for the furnace, according to the equation of continuity. Letting $V_f$ represent the velocity of the fast stratum 101, and $V_s$ represent the velocity of the slow stratum 103, the equation of continuity, for the flow condition of FIGURE 5, can be expressed as follows:

Volumetric flow through furnace
= Volumetric flow through throat 23
= (Volumetric flow of stratum 103) plus (volumetric flow of stratum 101)
= $V_s$ (area of stratum 103) plus $V_f$ (area of stratum 101)

Since the value of the factor (area of stratum 103) is relatively large, it will be understood that only a small increase in the magnitude of $V_s$ will cause the value of $V_f$ (area of stratum 101) to go to zero if the total volumetric flow through the furnace is maintained constant.

Since only a small increase in $V_s$ is required, it follows that only a small decrease in the viscosity of stratum 103, and hence only a small amount of electrical power is required to change the flow condition of FIGURE 5 to the flow condition of FIGURE 7, but only if such small amount of power is applied according to the present invention.

Referring to FIGURE 6, the graph illustrates a typical temperature gradient, taken vertically through the throat 23, for the flow condition of FIGURE 5. It is seen that the temperatures $T_s$ through the lower stratum 103 are relatively low as compared with the temperature $T_f$ through the hot upper stratum 101. Passing vertically through the boundary layer 105 there is a very rapid increase in temperature as indicated by the flat portion of the temperature gradient line in FIGURE 6.

FIGURES 8, 9, and 10 illustrate various temperature gradients taken vertically through the passage 23 for the flow condition of FIGURE 7, for various rates of power input relative to flow rates. It will be noted that the high-temperature portion of the gradient line of FIGURE 6, has, in each instance, been eliminated, and that the gradients may be altered or reversed depending upon the rate of heating of glass and the rate at which it can rise, as affected by the horizontal component due to the flow through the throat. Moreover, the lintel of the passage is not subjected to the high-temperature upper-stratum flow which was present under the flow condition of FIGURE 5.

The rise of heated glass in the active and restricted region of the throat results in rapid and effective convection which affords an intensive mixing action upon all the glass in process, thus strongly tending to eliminate cords and heterogeneity.

It will now further be obvious that the glass in flow 70 and the glass in strata 54 as shown in FIGURE 3, and as show to larger scale at 101 and 103 of FIGURE 5, cannot have been in the furnace for any but widely-varying lengths of time, such that there must be differences in age-under-heat, and consequently molecular structures, as well as differences in other vital characteristics.

By contrast, the accelerated and orderly progression of lower strata exclusively toward and through the throat, as seen in FIGURES 4 and 7, and at relatively high production with the present invention applied, results in much more nearly uniform age-under-heat of the glass passing through the throat.

Reference is next made to FIGURES 12 and 13 which illustrate the present invention applied to a furnace having a throat of the drop-bottom type. This furnace includes a melting basin indicated generally at 110 and a working basin indicated generally at 111. These two basins are connected by a drop-bottom throat, the bottom 112 of which is depressed below the bottom 113 of the melting basin.

FIGURES 12 and 13 further illustrate the application of a plurality of electrodes 115, 116, and 117, of the continuously-feedable type, extended through the throat bottom 118 and into the lower strata of molten silicates thereabove. In positioning the electrodes, the bottom 112 of the throat may be still further depressed as shown at 120 to increase the distance between the electrodes and the throat lintel 122.

Referring next to FIGURES 14, 15, and 16 the present invention is shown applied to a furnace throat structure in a manner whereby the heating effect of a plurality of electrodes 124, 125, 126, and 127 is concentrated just outside the entrance 128 of a throat 130 and adjacent to a wall surface 131 of a bridgewall 132 that separates a melting basin indicated generally at 133 from a working basin indicated generally at 134. The electrodes are shown extended through holes in a depressed bottom portion 135 below the bottom 136 of the melting basin 133.

While it is contemplated that 3-phase electric power will be used with the plurality of electrodes shown, it will be noted that this arrangement provides several ways in which said 3-phase electric power may be connected thereto.

For example, either the upstream electrode 127 or the downstream electrode 124 may be unconnected to one phase conductor of the 3-phase power supply, while the lateral electrodes 125 and 126 may be connected respectively to the other phase conductors of said 3-phase power supply.

The above mentioned choices of connections thus will serve to change the location of the power and heat concentration with respect to the throat entrance orifice.

Other combinations of power supply connections may be obtained, as by connecting the upstream electrode 127 common with the downstream electrode 124 to one phase conductor.

Alternately, the two lateral electrodes 125 and 126 may be connected common with one phase conductor.

Thus, flexibility of the heating effect most suitable to the flow and temperature conditions adjacent the throat entrance orifice may advantageously be obtained while the furnace is in operation and without the necessity of changing furnace structure.

Referring particularly to FIGURES 7 and 11, a pair of electrodes, having horizontally-extending flow-contacting members is illustrated by the T-shaped electrodes 80 and 81. As seen in FIGURE 11, electrode 81 includes a shank 82 extending upwardly through the hole 86 and a cross member 83 which extends transversely to the direction of flow at the throat, and which is disposed in a suitable recess 84 formed in the upper surface of the furnace bottom 25. This arrangement serves to lower the electrodes and consequently tends to lower the path of the electric current pattern through the molten glass whereby the heating effect is more specifically directed to the lower and more viscous portions of the flowing material. The T-shaped electrodes must be installed in a cold empty furnace and subsequently exposed to heat in the presence of air when the furnace is being heated for production. For the purpose of protecting the electrodes from rapid oxidation during such heating period, it has been found advantageous to apply coatings of water-soluble silicates or the like to the electrodes, and after placement, to keep the trench full of silicate particles having a low softening point, such as enamel, frit, or finely divided soft glass cullet. Thus when the heat of the furnace becomes sufficient to cause the said protective silicates to soften and flow, they will be retained by the trench and cover and protect the electrode from the air until the whole is subsequently covered by the molten silicates that are used to fill the furnace for production. From the foregoing it is evident that the combination of the trench 84, with a horizontally-extending electrode disposed therein provides both the lowest possible electrode location and means for retaining protective media around the electrode during the heating period.

The above described combination is particularly advantageous in practicing the present invention since it affords simple and effective means for specifically locating and uniformly distributing the electric energy in accordance with the present teaching.

The chief limiting factor in increasing the electric power applicable to an electrode of given dimensions immersed in hot molten silicates is the ability of the intensely heated glass immediately adjacent to it to escape from the region of high power concentration before the continued temperature rise of the molten silicates reaches a point where the silicates begin to disintegrate, with the formation of innumerable bubbles.

When an electrode is immersed in relatively quiescent molten silicates, such escape is, in turn, limited by the rate of upward movement of the thermal convection currents resulting from such heating, which currents must force their way through relatively viscous molten silicates.

In view of the foregoing, it will be obvious that the rate of such escape of silicates from the vicinity of the electrode will be increased, if the electrode is located in strata of molten silicates which, of themselves, are already moving relatively rapidly, and in a direction whereby the kinetic energy of their movement contributes an additional force which acts to increase the rate of escape or displacement from the vicinity of the electrode.

According to this invention, the electrodes are located to realize the above advantage inasmuch as the velocity of movement of the molten silicates within and in the region of a throat, must, under all operating conditions, be positively induced and relatively high.

Specifically, as seen in FIGURES 14 and 15, the electrodes are located in the converging flow immediately preceding the entrance 128 of the throat so as to concentrate electrical energy within a zone defined by a semicircle 140 having its center C on the center line 144 of the throat entrance 128 and in a vertical plane 142 defined by said throat entrance 128, said semicircle 140 having a radius R not greater than two times the width of said throat entrance 128.

It has been discovered, in accordance with the present invention, that when the electrodes 124–127 are located not farther from the throat than the semicircle 140 FIGURE 15 the heated glass, normally tending to rise, becomes entrained in the converging and hence accelerated flow entering the throat whereby the thermal energy of the electrodes is utilized in augmenting the horizontal component of flow towards and into the throat. If, on the other hand the electrodes 124–127 are located outside the semicircle 140 FIGURE 15, the thermal energy from the electrodes is dissipated in pumping glass vertically rather than towards and into the throat.

Cooling of the electrodes can be effected in any suitable manner, for example, a liquid coolant can be supplied to the electrode shanks.

In summary, the present invention provides various beneficial advantages when applied to the production of molten silicates used in the manufacture of useful products such as glassware and the like. Although the inventive concept is articulated by relatively simple structure, the beneficial advantages can only be achieved by specific and unobvious application of such structure to anomalous flow characteristics as set forth herein. Moreover, the process of the present invention is flexible, in that the operator of a melting furnace can selectively utilize the present teachings to increase production rates, obtain higher product quality, prolong furnace life, reduce operating temperatures and fuel costs, or to achieve various combinations thereof.

While the form of embodiment of the present invention as herein disclosed constitutes a preferred form, it is to be understood that other forms might be adopted, all coming within the scope of the claims which follow.

I claim:

1. A furnace for producing molten silicates comprising means for containing molten silicates, said means including a melting basin, a throat having an entrance and throat lintel located below the surface of said molten silicates for receiving a lower strata flow progressing substantially horizontally along the bottom of said basin and including a converging flow portion at said throat entrance, and heating means below said throat lintel in said converging flow portion at said throat entrance for concentrating thermal energy within a zone defined by a semicircle having its center on the center line of said throat entrance and in a vertical plane defined by said throat entrance, said semicircle having a radius not greater than two times the width of said throat entrance.

2. A furnace for producing molten silicates comprising means for containing molten silicates, said means including a melting basin, a throat having an entrance and throat lintel located below the surface of said molten silicates for receiving a lower strata flow progressing substantially horizontally along the bottom of said basin and including a converging flow portion at said throat entrance, and electrode means below said throat lintel and in said converging flow portion at said throat entrance and in contact with said converging flow portion for concentrating electrical energy on the center line of said throat entrance and in a vertical plane defined by said throat entrance, said semicircle having a radius not greater than two times the width of said throat entrance.

3. A furnace for producing molten silicates comprising means for containing molten silicates, said means including a melting basin, a throat having an entrance located below the surface of the molten silicates for receiving a lower strata flow progressing substantially along the bottom of said basin and including a converging flow portion at said portion at said throat entrance, the bottom of said throat being below the adjacent bottom of said containing means; and heating means remote from the top portion of said basin in said converging flow portion at said throat entrance for concentrating thermal energy on said flow portion to thereby accelerate the movement of said flow portion through said throat.

4. A furnace for producing molten silicates comprising means for containing molten silicates, said means being provided with a melting basin and a wall including a throat having a throat lintel for receiving a lower strata flow progressing substantially horizontally along the bottom of said basin and including a flow portion passing through said throat, and heating means below said lintel and in said flow portion before and within said throat for concentrating thermal energy on said flow portion to thereby accelerate the movement of said flow portion through said throat.

5. A furnace for producing molten silicates comprising means for containing molten silicates, said means being provided with a melting basin and a wall including a throat having a throat lintel for receiving lower strata flow progressing substantially horizontally along the bottom of said basin and including a flow portion passing through said throat, and a plurality of electrodes below said lintel and in said flow portion before and within said throat and in contact with said lower strata flow for concentrating electrical energy on said flow portion to thereby accelerate the movement of said flow portion through said throat.

6. A furnace for producing molten silicates comprising a melting basin; a working basin; a bridgewall separating said basins and including at least one submerged throat having openings communicating with said basins for delivering a submerged flow of molten silicates from said melting basin to said working basin; and temperature varying means for controlling the velocity of said flow through said throat, the effect of said temperature varying means being concentrated within a zone defined by a semicircle extending into one of said basins and having its center on the center of one of said throat openings, said semicircle having a radius not greater than two times the width of said throat opening.

7. The furnace defined in claim 6 wherein said temperature varying means comprises electrodes at certain of said throat openings.

8. A furnace for producing molten silicates comprising means for containing molten silicates, said means including a melting basin, a throat and throat lintel located below the surface of the molten silicates for receiving a lower strata flow progressing substantially horizontally along the bottom of said basin; and a plurality of electrodes below said lintel and projecting through said basin throat bottom at said throat and in contact with said lower strata flow for concentrating electrical energy on said lower strata flow to thereby accelerate the movement of said lower strata flow through said throat.

9. A furnace for producing molten silicates comprising a melting basin including a maximum temperature zone; a working basin; a bridgewall separating said basins and including at least one submerged throat having openings communicating with said basins for delivering a submerged flow of molten silicates from said melting basin to said working basin; and temperature varying means remote from said maximum temperature zone for controlling the velocity of said flow through said throat, the effect of said temperature varying means being concentrated at one of said throat openings.

10. The furnace defined in claim 9 wherein said temperature varying means comprises electrodes at certain of said throat openings.

References Cited in the file of this patent

UNITED STATES PATENTS

| | | |
|---|---|---|
| 1,880,541 | Wadman | Oct. 4, 1932 |
| 1,889,516 | McIntosh | Nov. 29, 1932 |
| 2,283,188 | Cornelius | May 19, 1942 |
| 2,512,761 | Arbeit | June 27, 1950 |
| 2,636,914 | Arbeit | Apr. 28, 1953 |